UNITED STATES PATENT OFFICE.

WILLIAM V. WATSON, OF SAN DIEGO, CALIFORNIA, ASSIGNOR OF ONE-HALF TO SAN DIEGO CONSOLIDATED GAS AND ELECTRIC COMPANY, OF SAN DIEGO, CALIFORNIA, A CORPORATION OF CALIFORNIA.

PLASTIC COMPOSITION AND METHOD FOR MAKING THE SAME.

1,398,613.  Specification of Letters Patent.  Patented Nov. 29, 1921.

No Drawing.  Application filed September 9, 1920.  Serial No. 409,061.

*To all whom it may concern:*

Be it known that I, WILLIAM V. WATSON, a citizen of the United States, residing at San Diego, in the county of San Diego and State of California, have invented certain new and useful Plastic Compositions and Methods for Making the Same, of which the following is a specification.

My invention relates to a plastic compound and the method for making the same more particularly adapted for use for road and street paving and like purposes and the objects of my invention are: first, to provide a plastic composition for roads, sidewalks and surfacing purposes; second, to provide a composition for such purposes which is composed principally of gas plant refuse and by products of very little value otherwise; third, to provide a composition of this class which is very durable, strong and is not brittle and liable to chip or break; and fourth to provide a composition of this class and a method for making the same which is very easy and economically compounded and applied.

With these and other objects in view as will appear hereinafter my invention consists of a certain novel plastic paving composition and a certain novel method of making plastic paving composition as will be hereinafter described in detail and particularly set forth in the appended claims.

My invention consists in preparing a composition which is composed principally of worthless refuse from gas plants as follows: gas plant carbon, briquet dust, usually termed lamp black, tar from oil and water gas, refuse sponge from gas plant purifiers which contains from 30 to 60% sulfur, in the form of sulfids, etc., and ordinary river bed sand and gravel.

The refuse from gas plant purifiers consists of a sponge which is made as follows: by taking wool shavings and adding sulfate of iron, slaked lime and oxidized iron filings and turnings to form iron oxid by weathering, which absorbs and collects all the poisonous, tarry oils, and sulfur from the sulfureted hydrogen, naphthalene and other antiseptic and poisonous combinations in crude burning gas.

This refuse discarded from the purifiers of gas plants contains approximately 40 to 60% of sulfur as sulfid, 5% of naphthalene and varying quantities of tar containing ammoniacal liquor and naphtha, carbolic oil, creosote oil, anthracene, pitch and asphalt, also traces of poisonous Prussian blue and cyanid combinations.

In preparing the composition I prefer to use the ingredients in about the following proportions, dry weight: gas plant purifier sponge, 1 part; sand or sand and gravel, 1 part; oil and water gas tar, 1 part; lamp black, $\frac{1}{2}$ part.

These ingredients are mixed, stirred, dewatered and fluxed by heating to about 200 degrees centigrade, then while hot applied for pavement, floors, walks or other purposes for which cement and concrete are used.

It will here be noted that it is also applicable for use in place of cement, concrete, asphaltum tar, etc., such as sewer and gas pipe as it is unaffected by water, either fresh or salt, acids, alkalis, illuminating and heating gas, vehicle lubricating oils, etc.

This composition may be dehydrated and allowed to cool and reheated for final use, smoothed, tamped or rolled as desired.

The sulfur, naphthalene, cyanid and other gas constituents in the gas purifier sponge combine at sulfur fusion between 100 and 200 degrees centigrade into a plastic mass that results in a remarkable composition similar to the vulcanizing of rubber, producing a plastic composition of very high tensile strength, the degree of hardness being dependent upon the moisture contents of the material.

It will be here noted that it is preferred to prepare the composition with the four ingredients as hereinbefore stated, however, experiment discloses that a plastic composition which might be practical though not so effective may be produced without the use of the lamp black and it is therefore desired to include in the application the composition without the use of the ingredient, lamp black as well as with it.

Having thus described my invention what I claim as new and desire to secure by Letters Patent is:

1. A plastic composition, consisting of refuse sponge from gas purifiers, sand, oil and water gas tar, and lamp black.

2. A plastic composition, consisting of refuse sponge from gas purifiers, one part;

sand, one part; oil and water gas tar, one part and lamp black, one-half part.

3. The herein described method of preparing plastic pavement, consisting in mixing refuse sponge from gas purifiers, sand and gravel, oil and water gas tar, and lamp black, thoroughly agitating the same, dewatering and fluxing by heating to about 200 degrees centigrade and while hot applied.

4. The herein described method of preparing plastic pavement, consisting in mixing refuse sponge from gas purifiers, sand and gravel, oil and water gas tar, lamp black, thoroughly agitating the same, heating, dewatering, then allowing it to cool and reheating to about 200 degrees centigrade for final use.

5. A plastic composition, comprising refuse sponge from gas purifiers, fine particles of stone, and oil and water gas tar.

6. A plastic composition, comprising refuse sponge from gas purifiers, fine particles of stone, and oil and water gas tar, in substantially equal proportions.

In testimony whereof, I have hereunto set my hand at San Diego, California, this 3 day of September, 1920.

WILLIAM V. WATSON.